US007322013B1

(12) United States Patent
Benson et al.

(10) Patent No.: US 7,322,013 B1
(45) Date of Patent: Jan. 22, 2008

(54) LAUNCH AND EDIT USER INTERFACE IMPROVEMENTS

(75) Inventors: Douglas S. Benson, Plano, TX (US); Alain M. Dumesny, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 972 days.

(21) Appl. No.: 10/011,266

(22) Filed: Oct. 25, 2001

(51) Int. Cl.
*G06F 3/048* (2006.01)
(52) U.S. Cl. .................. 715/837; 715/804; 715/515
(58) Field of Classification Search ............... 345/804, 345/330; 717/113, 115, 118; 709/202; 715/804, 715/515, 837
See application file for complete search history.

(56) References Cited

U.S. PATENT DOCUMENTS

| 5,613,124 | A | * | 3/1997 | Atkinson et al. ........... 345/557 |
| 5,634,019 | A | * | 5/1997 | Koppolu et al. ............ 345/744 |
| 5,715,432 | A | * | 2/1998 | Xu et al. .................... 345/764 |
| 5,729,741 | A | * | 3/1998 | Liaguno et al. ........... 707/104.1 |
| 5,838,906 | A | * | 11/1998 | Doyle et al. ................. 709/202 |
| 5,950,215 | A | * | 9/1999 | Tabuchi ....................... 715/515 |
| 6,470,363 | B1 | * | 10/2002 | Kanerva et al. ............ 715/530 |
| 6,704,120 | B1 | * | 3/2004 | Leone, III et al. ......... 358/1.18 |
| 2002/0078140 | A1 | * | 6/2002 | Kelly et al. ................. 709/203 |
| 2002/0143520 | A1 | * | 10/2002 | Gauthier et al. ............... 704/1 |

\* cited by examiner

*Primary Examiner*—Weilun Lo
*Assistant Examiner*—Sara M. Hanne
(74) *Attorney, Agent, or Firm*—Fulbright & Jaworski LLP

(57) ABSTRACT

A system and method is described for editing, in its native application, a source file of an object or image in a first application, wherein the source file includes computer-readable code or script associated with the source file and editable in either the first or native applications. The first application graphically displays an edit option selectable by the user to launch the source file's native application. The native application opens the source file and code or script associated with the object or image in the first application. Within the workspace of the native application edit session, an end function or button is displayed to the user. Upon selection of the end function in the native application, the user then returns automatically to the first application as the active application.

27 Claims, 3 Drawing Sheets

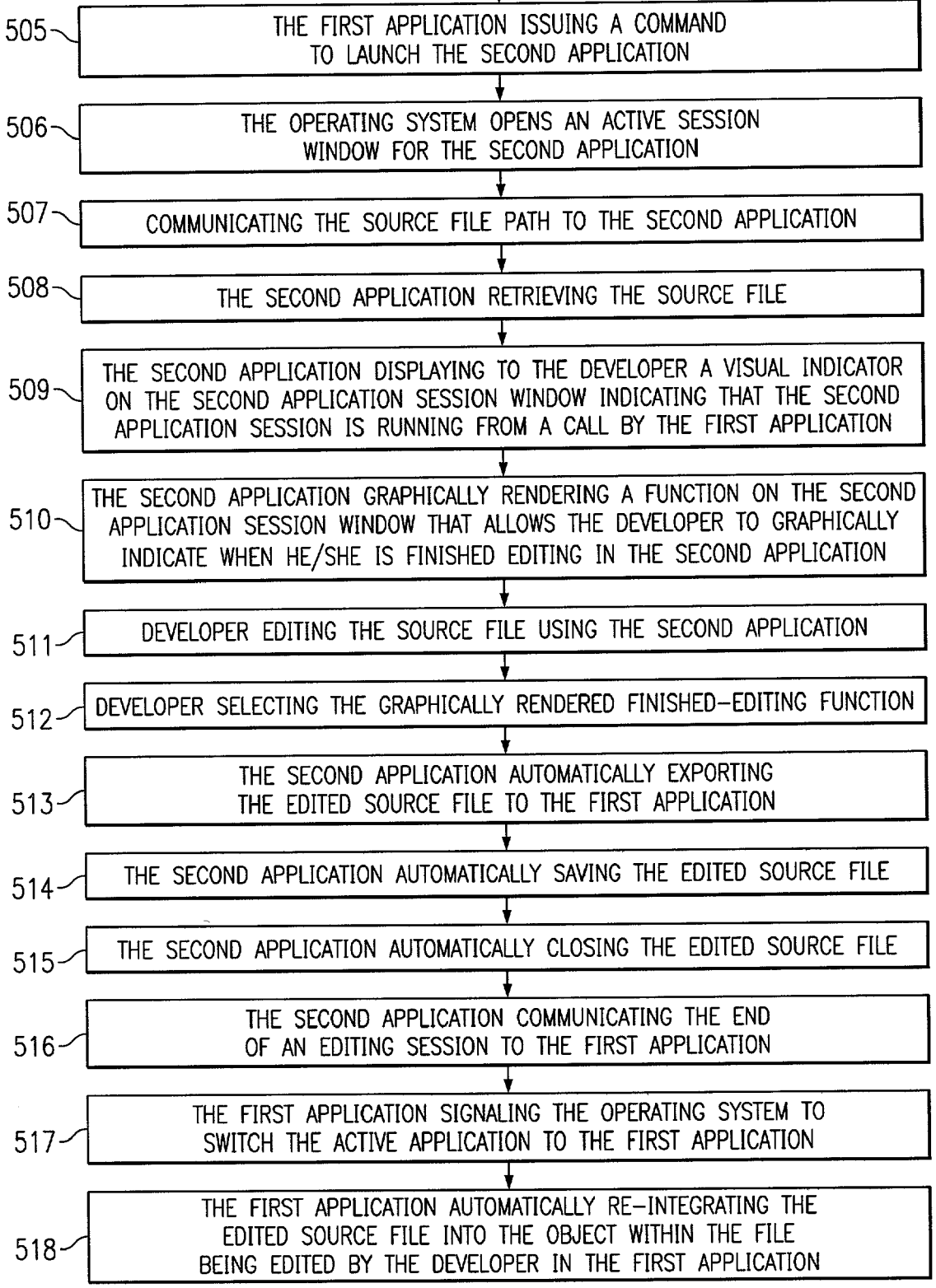

LAUNCH AND EDIT USER INTERFACE IMPROVEMENTS

BACKGROUND OF THE INVENTION

In a computer system, it is likely that a user will desire to move data from computer program A to computer program B. Once the data from computer program A has been copied into computer program B, it's also common for the user (working in program B) to then desire to edit the source data in program A. Prior experience with this problem required the user to launch the original application (program A), edit the original document or file, and, when finished editing, re-export that document or file back to program B. Re-exporting may also involve converting formats from the format compatible with program A to the program B format. It may also then require program B to re-integrate the new version of the data into the main file of program B.

The next evolutionary step was to enable the user in program B to launch the source file (in program A) directly from the exported destination file (in program B), so that the user could then edit the original source file. However, even in such a situation, the user is generally not launching the actual original application. Rather, the original application is brought into the destination file (in program B).

Existing applications, such as Fireworks™ (version 2) and Dreamweaver™ (version 2) [both of which are trademarked products of Macromedia Inc.], provide limited functionality in addressing this common problematic situation. Fireworks™ is an advanced graphics development application that is optimized for developing Web graphics by operating on both image data and on Web functionality associated with image data that may be defined by interactive languages such as hypertext markup language (HTML), extensible markup language (XML), Java, JavaScript, and the like. Dreamweaver™ is a Web development tool that may use the graphics files developed in Fireworks™. A method for launching and editing independent applications within Dreamweaver™ allows the user to select an image, for example, a graphics interchange format (GIF) image, and choose a menu command to edit the original source file, which may be in a different format, such as portable network graphics (PNG). By choosing the edit command in Dreamweaver™, Fireworks™ typically launches and attempts to find the original source file for the GIF image selected in Dreamweaver™. Fireworks™ generally provides for developing graphics PNG file, thus, the original Fireworks™ source file that corresponds to the GIF file selected in Dreamweaver™ would typically be a PNG file. Fireworks™ would usually then open the original PNG source file enabling the user to edit the file in the native application, Fireworks™.

When the user finishes editing the original PNG source file in Fireworks™, a menu command is typically chosen to save the user's edits. The user must also typically export manually any interactive and/or computer-readable code associated with the original PNG file. The user then generally manually exits Fireworks™ in order to return to Dreamweaver™. If the user has made any modifications or changes to the Web functionality in HTML or other code or script, Dreamweaver™ typically requires the user to first manually select the original image in the page, delete it with all associated code, and then typically to make another menu selection which prompts Dreamweaver™ to import the modified HTML, code, or other script associated with the original source file.

If, on the other hand, the user has only made graphical changes to an image, those modifications are usually automatically reloaded into the Dreamweaver™ file. However, because no other data, code, or script is transferred from the editing application, Fireworks™, the user will usually be required to make manual format modifications once the image file is reintegrated into the Dreamweaver™ file. Therefore, each type of edit made by a user typically requires additional manual steps for reintegration into the calling application, Dreamweaver™.

While this process creates interactivity between two separate applications, the unskilled user, or even a reasonably skilled user, does not typically appreciate, or even realize, that the Fireworks™ edit session is a special launch and edit session originating from another application, namely Dreamweaver™. To the user it appears as though he/she simply launched the second application, Fireworks™, and opened up the original source file. There is no visual indication to the user that editing the source file (in Fireworks™) would have any effect inside the calling application, Dreamweaver™ and the user must typically manually re-import or modify some of the data inside Dreamweaver™. At best, this is a confusing process.

In operation, when the user finishes editing in Fireworks™, he/she must typically switch back to Dreamweaver™ manually. Dreamweaver™ has no functionality to determine that the user in Fireworks™ has finished editing an image. Because Dreamweaver™ does not reload anything other than simple image changes, it generally cannot bring any of the web functional changes made in Fireworks™ back into the Dreamweaver™ file. Furthermore, the user must typically make manual changes in the calling application, Dreamweaver™, to fix the formatting of images edited and reloaded from the called application, Fireworks™. This problem has been partially addressed with a dialog box/menu in Dreamweaver™ that illustrates to the user something along the lines of, "You are editing an image from Fireworks™. Press Done when you are finished." This dialog is typically hidden by the Fireworks™ session window. The user would typically have to exit Fireworks™ and then manually click a Done button or select some other menu choice/option in the dialog to manually communicate to Dreamweaver™ that the editing session in Fireworks™ had finished. The selection instructs Dreamweaver™ to bring the resulting data back into Dreamweaver™ in the format typically edited by Dreamweaver™ and is re-integrated into the original Dreamweaver™ file.

There is an intermediate improvement in Fireworks™ (version 3) and Dreamweaver™ (version 3) that makes an incremental improvement to address these problems. At the start of an edit session, Dreamweaver™ transmits a command line parameter to Fireworks™ indicating the path of the original source file and prompts Fireworks™ to open the file for editing. Fireworks™ then typically allows the user to edit the images and Web functionality associated with the source file. When the user finishes editing, he/she must usually manually close the Fireworks™ edit session. Fireworks™ then generally passes a temporary file to Dreamweaver™ with a command line parameter indicating that Fireworks™ has completed the editing session and attempting to interpret any changes made to the formatting of the images. Dreamweaver™ reintegrates the edited image data from the temporary file into the Dreamweaver™ file. However, there is still no indication to the user that the user is launching the editing application Fireworks™, from the source application, Dreamweaver™, and provides no clear visible indication of how to return to Dreamweaver™ from Fireworks™. In fact, there is typically no clear indication that the user is even working in the called application, Fireworks™. Furthermore, no web functionality data associated with the image (i.e., HTML, XML, Java, JavaScript, and the like) is exported back to the calling application. The user must still typically manually re-import all of the modified web functionality into Dreamweaver™ if more than simple graphical changes were done in Fireworks™.

BRIEF SUMMARY OF THE INVENTION

The present invention is directed to a system and method which clarifies to the user how to edit a file using one program (for example, Fireworks™) from within another program (for example, Dreamweaver™) and how to get back to the original application without requiring any extra manual steps from the user. In a first embodiment, an Edit button has been added inside Dreamweaver's™ property inspector window. This Edit button operates such that when a user selects an image, if that image has Fireworks™ as its current system or application default editor, a small Fireworks™ (or which other application may be the application default editor) icon appears in conjunction with the Edit button itself. This icon tells the user that he/she can edit the image inside Fireworks™ (or any other application) even though the user is currently working inside the Dreamweaver™ program. Clicking the Edit button then launches the original application (Fireworks™) in the normal method and opens the source file associated with the exported file in Dreamweaver™ in the original application for that image. It should be noted that in alternative embodiments, the image indicating a particular application does not have to be displayed in conjunction with the Edit button.

In addition, when the second application is launched from the first application, a special user interface is created in the second application that is only displayed during the middle of a remotely controlled launch and edit session. The special user interface is preferably at the top (but may be any other location) of the target source document and preferably incorporates, for example, a Done button to tell the user how to finish. The special interface also preferably incorporates a series of icons or text that identify for the user the calling application, such as, for example, the Dreamweaver™ icon.

Also, by way of example, there may be an iconographic representation of the calling application (for example, Dreamweaver™) that is sending data to the called application (Fireworks™) in addition to a textual representation, such as, "Editing from Dreamweaver," to inform the user that he/she is editing in the called application, Fireworks™, from the calling application, Dreamweaver™. The user is also preferably presented a button or simple function option in the called application, Fireworks™, that allows the user to easily indicate that he/she is done editing in the called application and triggers the step of automatically taking the user back to the calling application, Dreamweaver™ without requiring any additional steps or searching for the correct menu choices. By actuating this done or finish editing option, the edited file is preferably re-imported to the calling application complete with all image and web functionality modifications and is seamlessly reintegrated into the calling application's file.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5B is a continuation of the flow chart illustrated in FIG. 5A.

DETAILED DESCRIPTION OF THE INVENTION

Figure 1:
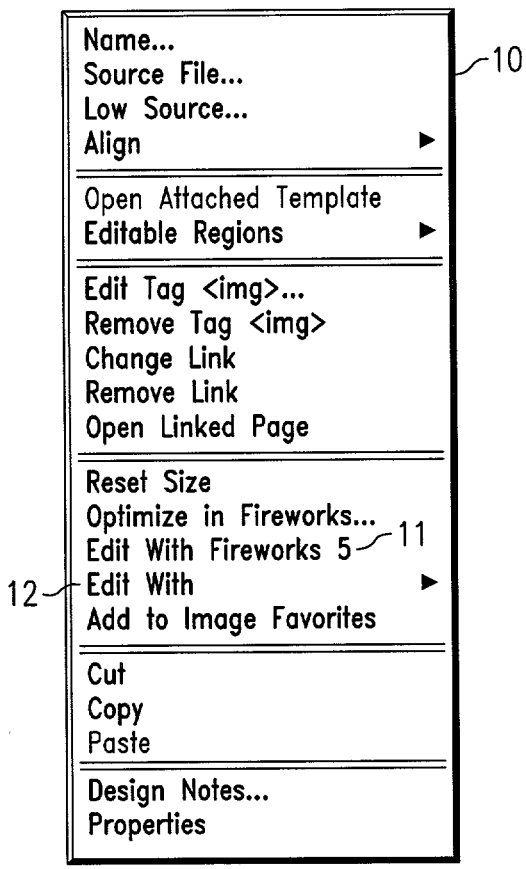
FIG. 1 illustrates a menu typically associated with prior art applications.

FIG. 1 illustrates pull-down menu 10 typical of the existing methods for launching a launch and edit session. In order to launch such a session, the user must not only know which menu choice to make to launch the session, he/she must know in which menu the launch and edit function resides. Pull-down menu 10 illustrates options 11 and 12, which would start launch and edit functions within the existing methods.

Figure 2:
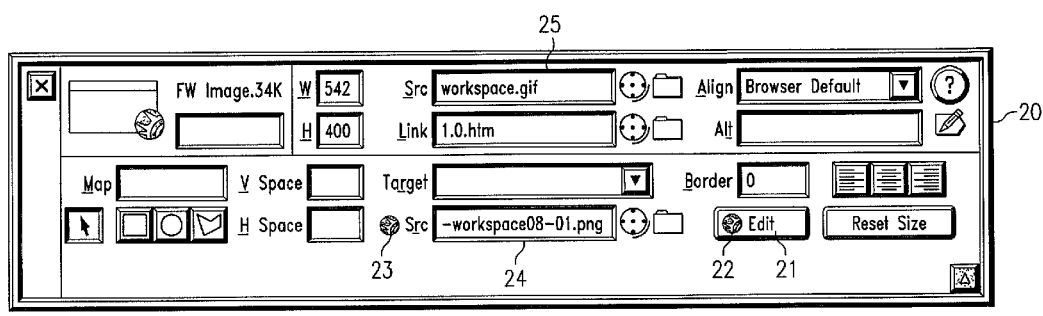
FIG. 2 illustrates an exemplary computer screen showing the controls for the present invention.

FIG. 2 shows property inspector window 20, from program B (the calling program). This can be, by way of example, Dreamweaver™. The operation manual for Dreamweaver™ is available from Macromedia, 600 Townsend, San Francisco, Calif. 94103, and is hereby incorporated by reference herein. Property inspector 20 preferably exists and is automatically displayed on the workspace of program B. Property inspector 20 preferably contains edit button 21. In this manner, the options for starting a launch and edit session are routinely visible to the user. If the selected image (for example image 34—FIG. 3) has Fireworks™ as its default image editor, the user will see Fireworks™ icon 22 in association with edit button 21. The operation manual for Fireworks™ is also available from Macromedia, 600 Townsend, San Francisco, Calif. 94103, and is hereby incorporated by reference herein. If the image is not from Fireworks™, then the user will preferably see an icon from the originating application. Because the particular icon shown in FIG. 2 is a Fireworks™ icon, Dreamweaver™ preferably knows that the original data to be edited came from or, at least, can be edited in Fireworks™ and knows what the source PNG file is.

Window 24 displays the path to the source PNG file which is distinct from the actual exported file displayed in window 25. Dreamweaver™ typically operates with the exported files in GIF format, as shown in window 25. Dreamweaver™ also indicates that the source file is editable by Fireworks™ through icon 23, as opposed to a source file editable in some other application. When the user actuates edit button 21, several steps happen: Dreamweaver™ invokes Fireworks™ to launch on the original source file as well as communicates the location of the document or file containing that image so that updates can automatically be done by Fireworks™. Also Dreamweaver™ may initially prompt the user to indicate or locate the original source file when not directly editing an image, for example, when editing a Fireworks™ table.

Figure 3:
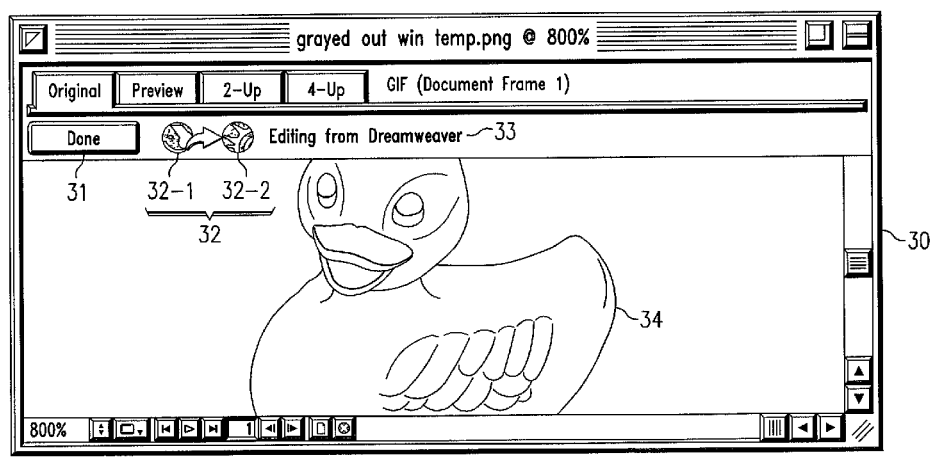
FIG. 3 illustrates an exemplary expanded screen showing what the user would see while editing an image using an embodiment of the present invention.

FIG. 3 illustrates image 34 (an image originally created in Fireworks™) displayed to the user under control now of Fireworks™ window 30. Text item 33 preferably indicates, "Editing from Dreamweaver." If Dreamweaver™ were not the calling application, that text string would preferably say, "Editing from the XXXX application," wherein "XXXX" is preferably the name of the calling application. One such calling application could also be Macromedia Flash™, another could be FreeHand™, or it could be any application that supports the launch and edit mechanism discussed herein. Window 32 preferably shows an iconographic representation of the calling application. This is an optional method of identification and shows, if desired, the direction of work flow, via 32-1 and 32-2 through the arrow connecting them. In the display 32, 32-1 (Dreamweaver™) is shown moving toward icon 32-2 (Fireworks™), thus display 32 indicates a workflow from Dreamweaver™ to Fireworks™.

Figure 4:
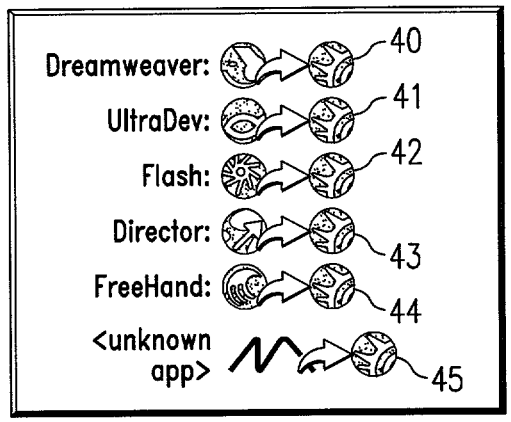
FIG. 4 illustrates an exemplary table showing a sample of possible application possibilities in an application implementing an embodiment of the present invention.

FIG. 4 is a table showing other possible configurations for window 32. Such a table may be available to a user as a key to the icons represented in window 32. Icon 40 illustrates one example that may be used to indicate workflow from Dreamweaver™ to Fireworks™. Icon 41 illustrates one example that may be used to indicate workflow from UltraDev™ to Fireworks™. Icon 42 illustrates one example that may be used to indicate workflow from Macromedia Flash™ to Fireworks™. Icon 43 illustrates one example that may be used to indicate workflow from Director™ to Fireworks™. Icon 44 illustrates one graphical example that may be used to indicate workflow from FreeHand™ to Fireworks™ ™. Icon 45 illustrates one graphical example that may be used to indicate workflow from any unknown application to Fireworks™ should one of the applications, for instance Fireworks™, not recognize the application originating the workflow.

Button 31 (FIG. 3) is preferably a Done button, giving the user the ability to control when he/she is finished editing in the called application. By actuating button 31, several steps are triggered. The file is preferably automatically saved; the file is preferably automatically re-exported to the calling application as well as any supporting data that go along with the file, such as an HTML document that contains the image; the re-exported file is automatically converted from the format of the target application into the format of the calling application; the source file is preferably automatically closed; and the target application (Fireworks™, in the example) preferably switches the user back to the calling application (Dreamweaver™, in the example). However, in operation of the preferred embodiment, the target application does not close, but rather preferably makes Dreamweaver™ the active application. The HTML, XML, Java, or other code and/or script and the image or images that are exported from the target application are then preferably automatically reintegrated into Dreamweaver™ (i.e., the calling application) at that point. The user's launch and edit session is finished, and the document has been updated to reflect all changes made in Fireworks™.

Figure 5A:
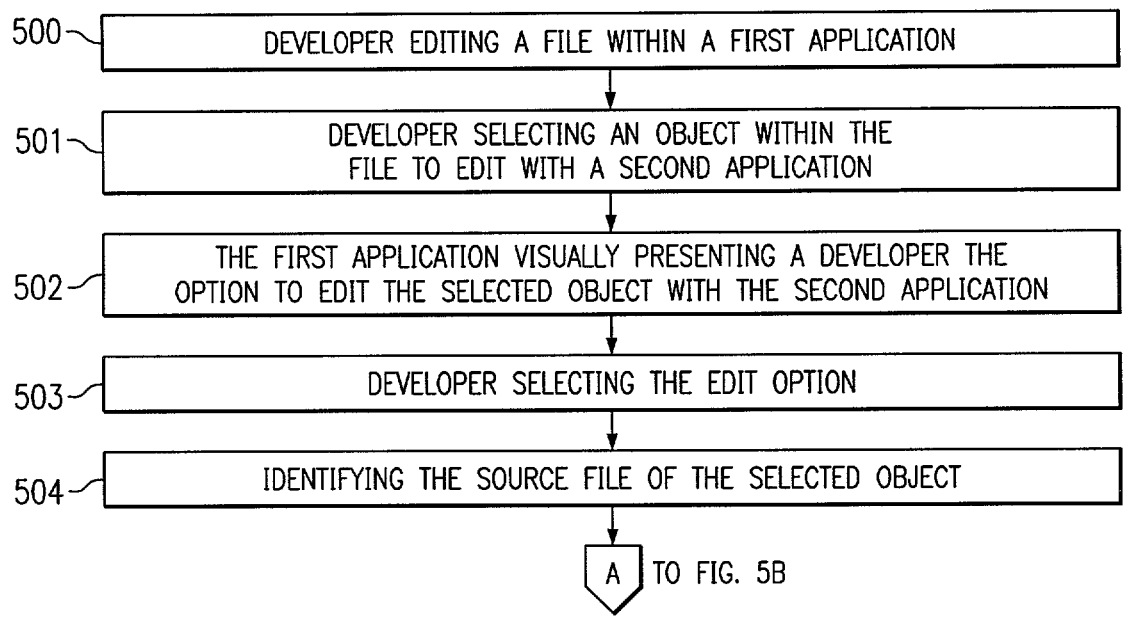
FIG. 5A is a flow chart illustrating the steps typically executed in implementing a preferred embodiment of the present invention.

FIG. 5A is a flow chart of the steps typically executed in implementing a preferred embodiment of the present invention. In step 500 the developer edits a file within a first application. The developer then selects an object within the file to edit with a second application in step 501. In step 502, the first application preferably visually presents the developer an option to edit the selected object with the second application. If the developer desires to edit the object, he or she preferably selects the visually presented edit option of the first application in step 503. Upon this selection, the source file of the selected object is preferably identified in step 504. It should be noted that alternative methods of identifying the selected object may be employed. In one embodiment, the first application may preferably identify the source, while in alternative embodiments, the second application or even the operating system may identify the source file.

In step 505, shown in FIG. 5B, the first application preferably issues a command to launch the second application, which causes the operating system to open an active session window for the second application in step 506. In the launching process, the source file path is preferably communicated to the second application in step 507. It should be noted that the source file path may be communicated by the first application or by the operating system, or even by the second application itself. Once all the necessary paths are known, the second application retrieves the source file communicated by the first application in step 508.

With the second application now open with the source file in the active session window, the second application displays to the developer, in step 509, a visual indicator on the second application session window indicating that the second application session is running from a call by the first application. In addition to the visual indicator, the second application graphically renders a function on the second application session window, in step 510, that allows the developer to graphically indicate when he or she is finished editing the source file in the second application. Step 511 generally comprises the developer actually editing or modifying the source file using the second application. Once the developer has finished the editing, he or she will preferably select the graphically rendered finished-editing function in step 512.

On selection of the finished-editing function, the second application automatically exports the edited source file to the first application in step 513. The second application also automatically saves the edited source file in step 514. After saving the source file, the second application automatically closes the edited source file in step 515. With the edited source file now closed after the editing session, the second application communicates the end of an editing session to the first application in step 516. The first application then signals the operating system to switch the active application back to the first application in step 517. In step 518, the first application automatically re-integrates the edited source file into the object within the file being edited by the developer in the first application, thus, completing the launch and edit session.

It should be noted that although the examples and embodiments described in this application have specified only Macromedia, Inc., products, such as Fireworks™ and Dreamweaver™, the present invention is not limited only to those noted products. The present invention may preferably be used or implemented in any software applications in which a first program application may use or work with data, objects, or files that originated in a second program application.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of working in a first application and editing one or more files in a second application launched from said first application, the method comprising the steps of:
   identifying, under control of a user in said first application, a file to be edited;
   identifying, under control of said first application, a second application in which to edit a source file of said identified file;
   notifying said user in said first application of said identified second application;
   launching said identified second application such that said user may edit said source file in said launched second application;
   visibly displaying a completion option to said user within said second application; and
   displaying, to said user in said second application, a direction of workflow for said source file being edited, said direction of workflow including graphical representations of said first and second applications, wherein said graphical representations include icons illustrating said first and second applications.

2. The method of claim 1 wherein said identifying said second application step includes the step of:
   displaying icons illustrating said first and second applications.

3. The method of claim 1 wherein said identifying said second application step includes the step of:
   displaying text illustrating at least one of:
      said first application; and
      said second application.

4. The method of claim 1 further comprising the step of:
   displaying a launch option to said user for enabling said launching step.

5. The method of claim 1 further comprising the step of:
   accepting, from said user, a command to continue prior to the enabling of said launching step.

6. The method of claim 1 further including the step of accepting said completion option selected by said user in said second application, said accepted completion option enabling at least one of the steps of:
   saving said source file in said second application;
   exporting said source file to said first application; and
   transferring the user to said first application.

7. The method of claim 6 wherein said exporting step further includes the step of:
   exporting edited code from said second application relating to said source file.

8. The method of claim 7 wherein said code comprises at least one of:
   HTML;
   XML;
   Java; and
   JavaScript.

9. The method of claim 7 further comprising the step of:
   integrating said source file and said edited code into said file of said first application.

10. The accepting said completion option step of claim 6 further enabling the step of:
    converting a second application format of said source file into a first application format.

11. The accepting said completion option step of claim 6 further enabling the step of:
    closing said source file in said second application.

12. The method of claim 1 further comprising the step of:
    displaying, to said user in said second application, a text message indicating that said user is editing in said second application from said first application.

13. The method of claim 12 further comprising the step of:
    displaying, to said user in said second application, an iconic message indicating that said user is editing in said second application from said first application.

14. The method of claim 1 further comprising the step of:
    displaying information to said user in said first application about said source file of said selected file.

15. The method of claim 14 further comprising the step of:
    displaying information to said user in said first application about said selected file.

16. A method of working in a first application and editing one or more files in a second application launched from said first application, the method comprising the steps of:
    identifying, under control of a user in said first application, a file to be edited;
    identifying, under control of said first application, a second application in which to edit a source file of said identified file;
    notifying said user in said first application of said identified second application;
    launching said identified second application such that said user may edit said source file in said launched second application;
    visibly displaying a completion option to said user within said second application; and
    displaying, to said user in said second application, an iconic message indicating that said user is editing in said second application from said first application.

17. A system for launching an edit session of a called application from a calling application, said system comprising:
    a computer system with a computer screen; means for selecting a file within said calling application under control of a user;
    means for rendering an edit option to said user in said calling application to edit said selected file in said called application;

means for launching said edit session of said called application responsive to said user selecting said edit option in said calling application;

means for said calling application to transmit information about a source file associated with said selected file to said called application;

means for said called application to open said source file in said edit session;

means for said called application to graphically present an end function to said user to end said edit session; and means for said called application to render a graphical indicator to said user indicating that said edit session of said called application was initiated by said calling application, wherein said graphical indicator comprises:

means for displaying iconographic images of said calling application and said called application.

18. The system of claim 17 further comprising:

means for said calling application to identify said source file for said selected file.

19. The system of claim 18 further comprising:

means for displaying data to said user concerning said source file.

20. The system of claim 18 further comprising:

means for displaying data to said user concerning said selected file.

21. The system of claim 17 further comprising:

means for said called application to accept said user activating said end function to end said edit session;

means for said called application to automatically save said source file responsive to said user activating said end function;

means for said called application to automatically export said source file to said calling application;

means for said called application to transmit a signal to said calling application indicating an end to said edit session responsive to said user activating said end function; and means for said calling application to automatically integrate said exported source file into said selected file responsive to receipt of said signal.

22. The system of claim 21 wherein said source file comprises:

file data; and code associated with said file data.

23. The system of claim 21 further comprising:

means for said called application to close said source file.

24. The system of claim 21 further comprising:

means for said called application to signal an operating system to switch said user to said calling application.

25. The system of claim 21 further comprising:

means for converting said exported source file into a format compatible with said calling application.

26. The system of claim 17 wherein said graphical indicator comprises:

means for displaying a text message to said user indicating that said calling application initiated said edit session of said called application.

27. The system of claim 17 wherein said graphical indicator further comprises:

means for displaying a text message to said user indicating that said calling application initiated said edit session of said called application.

* * * * *